US010435170B2

(12) United States Patent
Carralero et al.

(10) Patent No.: US 10,435,170 B2
(45) Date of Patent: Oct. 8, 2019

(54) SYSTEMS AND METHODS FOR INSTALLATION OF SENSORS FOR FUEL QUANTITY INDICATING SYSTEMS

(71) Applicant: The Boeing Company, Chicago, IL (US)

(72) Inventors: Michael Carralero, Huntington Beach, CA (US); Paul Truzzi, Kent, WA (US); Kawthar Kasim, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 278 days.

(21) Appl. No.: 15/373,126

(22) Filed: Dec. 8, 2016

(65) Prior Publication Data

US 2018/0164140 A1   Jun. 14, 2018

(51) Int. Cl.

| | | |
|---|---|---|
| *G01F 23/14* | (2006.01) | |
| *B64D 37/00* | (2006.01) | |
| *B64D 37/04* | (2006.01) | |
| *G01L 9/00* | (2006.01) | |
| *G01L 19/00* | (2006.01) | |
| *G01L 19/14* | (2006.01) | |
| *G01F 23/16* | (2006.01) | |

(52) U.S. Cl.
CPC .......... *B64D 37/005* (2013.01); *B64D 37/04* (2013.01); *G01F 23/164* (2013.01); *G01L 9/0079* (2013.01); *G01L 19/003* (2013.01); *G01L 19/149* (2013.01); *Y02T 50/44* (2013.01)

(58) Field of Classification Search
CPC ..... B64D 37/005; B64D 37/04; G01F 23/164; G01F 23/205; G01L 9/0079; G01L 9/003; Y02T 50/44; G01N 21/31; G06F 17/00
See application file for complete search history.

(56) References Cited

U.S. PATENT DOCUMENTS

| | | | | |
|---|---|---|---|---|
| 9,415,682 | B2* | 8/2016 | Aso | B60K 15/04 |
| 9,500,808 | B2* | 11/2016 | Carralero | G02B 6/4277 |
| 2010/0318243 | A1* | 12/2010 | Lewis | B64D 45/00 |
| | | | | 701/3 |
| 2014/0166852 | A1* | 6/2014 | Hauzeray | G01J 1/0228 |
| | | | | 250/205 |
| 2016/0231231 | A1* | 8/2016 | Chan | G01K 1/00 |

* cited by examiner

*Primary Examiner* — Harshad R Patel
*Assistant Examiner* — Nigel H Plumb
(74) *Attorney, Agent, or Firm* — McDonnell Boehnen Hulbert & Berghoff LLP

(57) ABSTRACT

An example system includes a fuel tank, fittings mounted through a wall of the fuel tank, and optical sensors positioned within the fittings. A respective optical sensor includes a first pressure sensing end inserted through a fitting and internally into the fuel tank and a second end extending externally from the fuel tank. The system also includes an optical fiber bundle mounted external to the fuel tank, and having an optical fiber connected to each of the plurality of optical sensors for guiding light to each of the plurality of optical sensors.

20 Claims, 6 Drawing Sheets

SYSTEMS AND METHODS FOR INSTALLATION OF SENSORS FOR FUEL QUANTITY INDICATING SYSTEMS

FIELD

The present disclosure relates generally to systems and methods for installing sensors into a fuel tank for determining a fuel level measurement of the fuel tank, and more particularly to, using a fitting enabling for exterior mounting of the sensors to the fuel tank.

BACKGROUND

Many airplanes today use capacitive based fuel quantity indicating systems, in which fuel probes include two concentric tubes that act as capacitors. Metal wires for the probes are inserted inside a fuel tank, and redundant supports are provided for the wiring, which increases an overall weight of the system, and increases a manufacturing time of the system.

In operation, as the probes are submerged in fuel in the fuel tank, a dielectric changes a capacitive output of the probes. The outputs of the probe are transmitted to a processing unit to determine a total amount of fuel in the fuel tank.

Other types of probes include ultra-sonic probes instead of capacitive probes inserted inside the fuel tank. The ultra-sonic probes are tubes and a top of the probes send an ultra-sonic signal to a bottom of the probes. The way the signal propagates through the medium, whether fuel or air, in combination with whether the signal contacts a fuel surface determines a fuel height in the fuel tank. Again, this type of quantity indicating systems requires metal wires in the fuel tank and redundant supports, which increases a system weight and manufacturing time.

What is needed is a fuel indicating system that provides an electromagnetic interference (EMI) safe system requiring no metal in the fuel tank, which eliminates metal wires in the fuel tank and a need for redundant supports as well as decreases system weight and manufacturing time.

SUMMARY

In one example, a system is described that includes a fuel tank, a plurality of fittings mounted through a wall of the fuel tank, and a plurality of optical sensors positioned within the plurality of fittings. A respective optical sensor includes a first pressure sensing end inserted through the fitting and internally into the fuel tank and a second end extending externally from the fuel tank. The system also includes an optical fiber bundle mounted external to the fuel tank, and the optical fiber bundle has an optical fiber connected to each of the plurality of optical sensors for guiding light to each of the plurality of optical sensors.

In another example, an aircraft is described that includes a fuel tank positioned in a wing of the aircraft, a plurality of fittings mounted through a wall of the fuel tank, and a plurality of optical sensors positioned within the plurality of fittings. A respective optical sensor includes a first pressure sensing end inserted through the fitting and internally into the fuel tank and a second end extending externally from the fuel tank. The aircraft also includes an optical fiber bundle mounted external to the fuel tank, and the optical fiber bundle has an optical fiber connected to each of the plurality of optical sensors for guiding light to each of the plurality of optical sensors.

In another example, a method for installing optical sensors for a fuel level measurement system is described. The method includes mounting a plurality of fittings through a wall of a fuel tank, and positioning a plurality of optical sensors within the plurality of fittings. A respective optical sensor includes a first pressure sensing end inserted through the fitting and internally into the fuel tank and a second end extending externally from the fuel tank. The method also includes mounting an optical fiber bundle external to the fuel tank, and the optical fiber bundle has an optical fiber connected to each of the plurality of optical sensors for guiding light to each of the plurality of optical sensors.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples, systems and methods for installation of sensors for fuel quantity indicating systems are described. Installation methods of optical sensors described herein can replace current fuel quantity indication systems (FQIS) with a new intrinsically EMI safe system that requires no metal in the fuel tank. The optical sensors can be mounted externally to the fuel tank to reduce maintenance of fuel tanks as well.

An example system includes a fuel tank, fittings mounted through a wall of the fuel tank, and optical sensors positioned within the fittings. A respective optical sensor includes a first pressure sensing end inserted through a fitting and internally into the fuel tank and a second end extending externally from the fuel tank. The system also includes an optical fiber bundle mounted external to the fuel tank, and having an optical fiber connected to each of the plurality of optical sensors for guiding light to each of the plurality of optical sensors.

Figure 1:
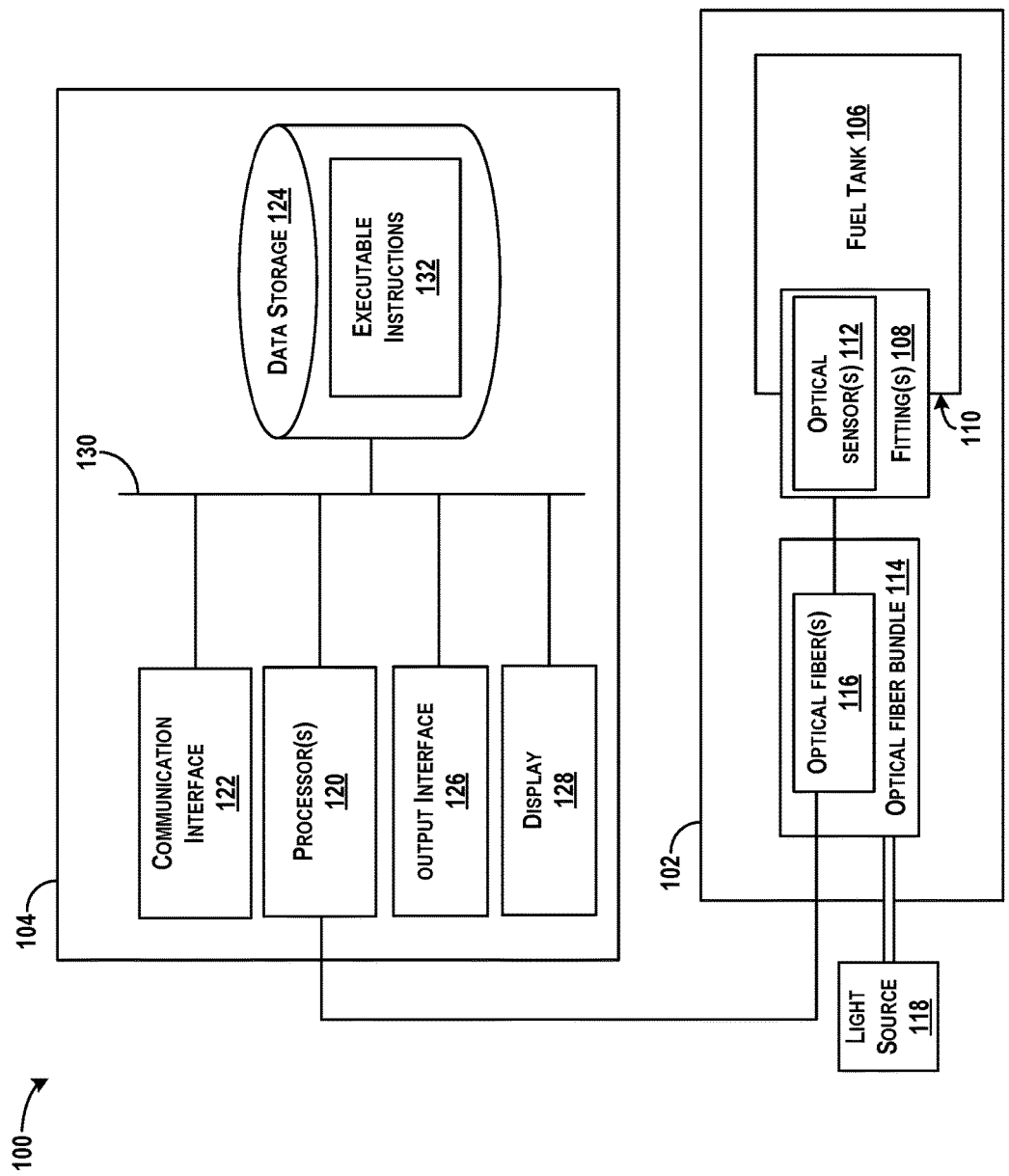
FIG. 1 is a block diagram of an apparatus, according to an example embodiment.

Referring now to FIG. 1, a block diagram of an apparatus 100 is illustrated, according to an example embodiment. The apparatus 100 includes a system 102 coupled to a computing device 104.

The system 102 includes a fuel tank 106, a plurality of fittings 108 mounted through one or more walls, such as a wall 110, of the fuel tank 106, and a plurality of optical sensors 112 positioned within the plurality of fittings 108. The system 102 also includes an optical fiber bundle 114 mounted external to the fuel tank 106, and the optical fiber bundle 114 has optical fiber(s) 116 connected to each of the plurality of optical sensors 112 for guiding light to each of the plurality of optical sensors 112.

The fuel tank 106 can be a single fuel tank with a single section, a single fuel tank with multiple sections, or multiple fuel tanks as well.

The fitting(s) 108 can include a plastic material, or other composite material. In one example, the fitting(s) 108 do not include any metal material, and thus, no metal is introduced into the fuel tank 106.

The optical sensor(s) 112 each include a sensor chip 140 and a diaphragm 142 that deflects when ambient pressure differs from a reference pressure of the sensor chip 140, as described in more detail with reference to FIG. 2 below. In one example, the optical sensor(s) 112 include photonic crystal optical pressure sensors.

The optical fiber bundle 114 includes the optical fiber(s) 116 that are used to carry light. The optical fiber(s) 116 may be individually coated with plastic layers and contained in a protective tube. Different types of cable can be used, and arranged together within the optical fiber bundle 114. The optical fiber bundle 114 is arranged to connect to the optical sensor(s) 112 external to the fuel tank 106. As shown in FIG. 1, the entire optical fiber bundle 114 may be positioned external from the fuel tank 106.

A light source 118 is coupled or connected to the optical fiber bundle 114 for generating the light that is carried by the optical fiber(s) 116. The light source 118 can include a single light emitting diode (LED), or multiple LEDs, for example. The light source 118 can be connected to the optical fiber bundle 114 outside of the fuel tank 106.

The computing device 104 has a processor(s) 120, and also a communication interface 122, data storage 124, an output interface 126, and a display 128 each connected to a communication bus 130. The computing device 104 may also include hardware to enable communication within the computing device 104 and between the computing device 104 and other devices (not shown). The hardware may include transmitters, receivers, and antennas, for example.

The communication interface 1122 may be a wireless interface and/or one or more wireline interfaces that allow for both short-range communication and long-range communication to one or more networks or to one or more remote devices. Such wireless interfaces may provide for communication under one or more wireless communication protocols, such as Very High Frequency (VHF) Data link (VDL), VDL Mode 2, Aircraft Communications Addressing and Reporting System (ACARS) digital communications over VHF radio and satellite communications (SATCOM), Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include aircraft data buses such as Aeronautical Radio, Incorporated (ARINC) 429, 629, or 664 based interfaces, Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 122 may be configured to receive input data from one or more devices, and may also be configured to send output data to other devices.

The data storage 124 may include or take the form of one or more computer-readable storage media that can be read or accessed by the processor(s) 120. The computer-readable storage media can include volatile and/or non-volatile storage components, such as optical, magnetic, organic or other memory or disc storage, which can be integrated in whole or in part with the processor(s) 120. The data storage 124 is considered non-transitory computer readable media. In some embodiments, the data storage 124 can be implemented using a single physical device (e.g., one optical, magnetic, organic or other memory or disc storage unit), while in other embodiments, the data storage 124 can be implemented using two or more physical devices.

The data storage 124 thus is a non-transitory computer readable storage medium, and executable instructions 132 are stored thereon. The instructions 132 include computer executable code. When the instructions 132 are executed by the processor(s) 120, the processor(s) 120 are caused to perform functions. Such functions include receiving outputs indicative of respective pressures from the optical sensors 112, and determining a fuel level measurement of the fuel tank 106 based on the outputs of the optical sensors 112.

The processor(s) 120 may be a general-purpose processor or a special purpose processor (e.g., digital signal processors, application specific integrated circuits, etc.). The processor(s) 120 may receive inputs from the optical fiber bundle 114, and process the inputs to generate outputs that are stored in the data storage 124 and output to the display 128. The processor(s) 120 can be configured to execute the executable instructions 132 (e.g., computer-readable program instructions) that are stored in the data storage 124 and are executable to provide the functionality of the apparatus 100 described herein.

The output interface 126 outputs information to the display 128 or to other components as well. Thus, the output interface 126 may be similar to the communication interface 122 and can be a wireless interface (e.g., transmitter) or a wired interface as well.

The apparatus 100 may be included within a number of different vehicles, including aircraft, automobiles, or boats, for example.

Figure 2:
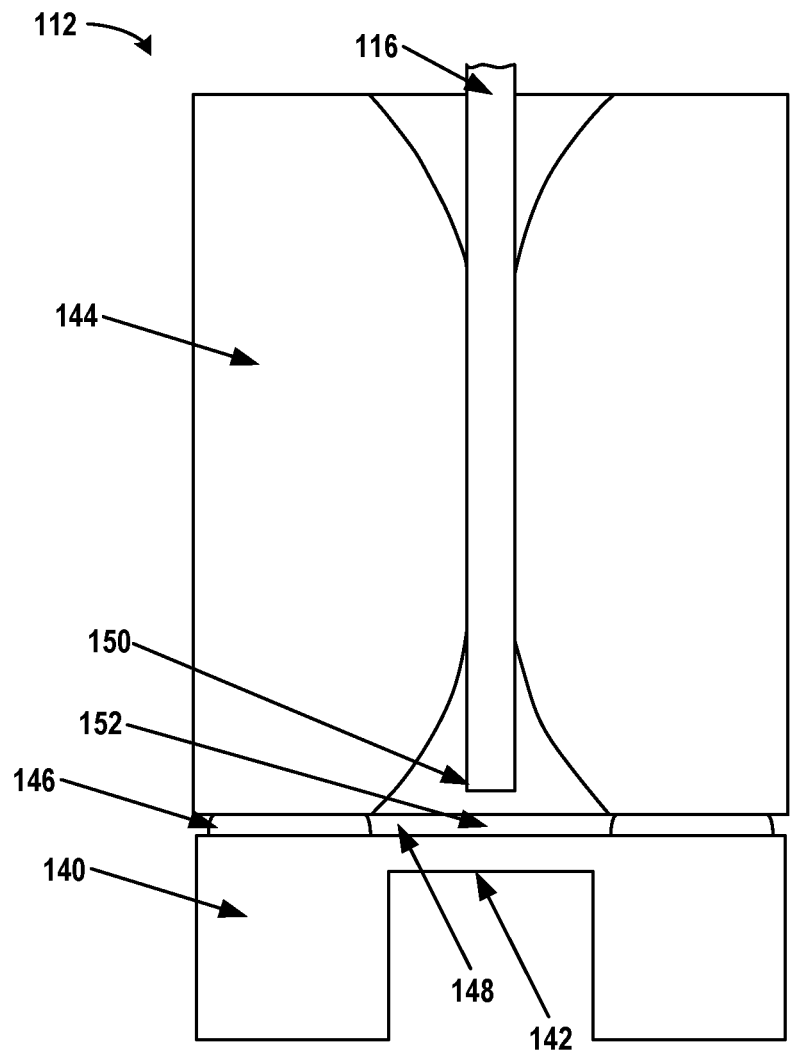
FIG. 2 illustrates an example of one of the optical sensors, according to an example embodiment.

FIG. 2 illustrates an example of one of the optical sensor(s) 112, according to an example embodiment. The optical sensor 112 includes a sensor chip 140 and a diaphragm 142, and the diaphragm 142 may be a center portion of the sensor chip 140. The optical fiber(s) 116 is mounted in a ferule 144 and the sensor chip 140 is mounted on a facet of the ferule 144 using an adhesive 146, so as to form a reference pressure cavity 148 that has a reference pressure. The diaphragm 142 of the sensor chip 140 deflects when the ambient pressure is different from the reference pressure.

In one example, the optical sensor 112 is a micro-electro-mechanical system (MEMS) device, and changes in deflection of the diaphragm can be measured based on reflection of light.

In an example operation of the optical sensor 112, light traveling on the optical fiber(s) 116 down toward the diaphragm 142 is partially reflected from a fiber facet 150 (e.g., first reflector) and then partially reflected from the diaphragm 142 of the sensor chip 140 shown at arrow 152 (e.g., second reflector). These two reflected waves interfere, and if a distance between the first reflector and the second reflector is an integer of half wavelengths, the reflections of light interfere constructively and a total reflection is high (or higher than a threshold). If a distance between the first reflector and the second reflector is an integer of half wavelengths plus a quarter wavelength, then the reflections of light interfere destructively and a total reflection is low (or lower than a threshold). If a separation of the first reflector and the second reflector is between these values, then a total reflection is between a high and a low value. The reflected light is therefore a measure of a reflector separation, which is a measure of the ambient pressure. In further examples, intensity of the reflected light and a phase between the different reflections provides a pressure measurement. Lookup tables can be provided with reference to the pressure that corresponds to the reflected light.

In one example, the outputs of the optical sensor(s) 112 include reflected light off of respective diaphragms, and the processor(s) 120 determine a respective pressure based on the reflected light. The processor(s) 120 may refer to a lookup table to identify the measured pressure that corresponds to the amount of reflected light. In some examples, a light detector or spectrometer can be included to provide further outputs to the processor(s) 120 to provide information useful to determine the pressure.

To determine a fuel level measurement of fuel in the fuel tank 106, a volume of the fuel is calculated and density of fuel utilized. To determine the volume, a height of fuel in the fuel tank 106 is first determined. Outputs of the optical sensor(s) 112 can be used to determine the height. For example, the diaphragm 142 of the optical sensor(s) 112 deflects when ambient pressure differs from a reference pressure of the sensor chip 140, and this will occur when the fuel is at or above a level of the optical sensor(s) 112 so as to contact the diaphragm 142. Thus, when the optical sensor(s) 112 are submerged in fuel or are in air during flight in the fuel tank 106, a pressure delta is apparent and the outputs of the optical sensor(s) 112 change due to deflection of the diaphragm 142.

In one example, the optical sensors(s) 112 can be mounted internally within the fuel tank 106. The optical sensor(s) 112 are small and lightweight, and thus, can be clipped to a bottom surface internally within the fuel tank 106. The optical fiber(s) 116 can be bundled running inside of the fuel tank 106 to a connector. However, internal mounting of the optical sensor(s) 112 can make it difficult to perform maintenance, and also can require additional components.

Within additional examples described herein, the optical sensor(s) 112 are mounted within the fitting(s) 108 external to the fuel tank 106. The optical sensor(s) 112 can be mounted through the wall 110 to maintain components of the system 102 external to the fuel tank 106. An example advantage of the external mounting is that when an optical sensor or an optical fiber requires maintenance, all maintenance is external to the fuel tank 106. Thus, entry into the fuel tank 106 is required, and no draining of the fuel tank 106, purging of nitrogen enriched air, and flushing of the fuel tank 106 is needed.

Furthermore, there is more room on an exterior of the fuel tank 106, as compared to an interior of the fuel tank 106, to perform installations and maintenance making the process easier.

Figure 3:
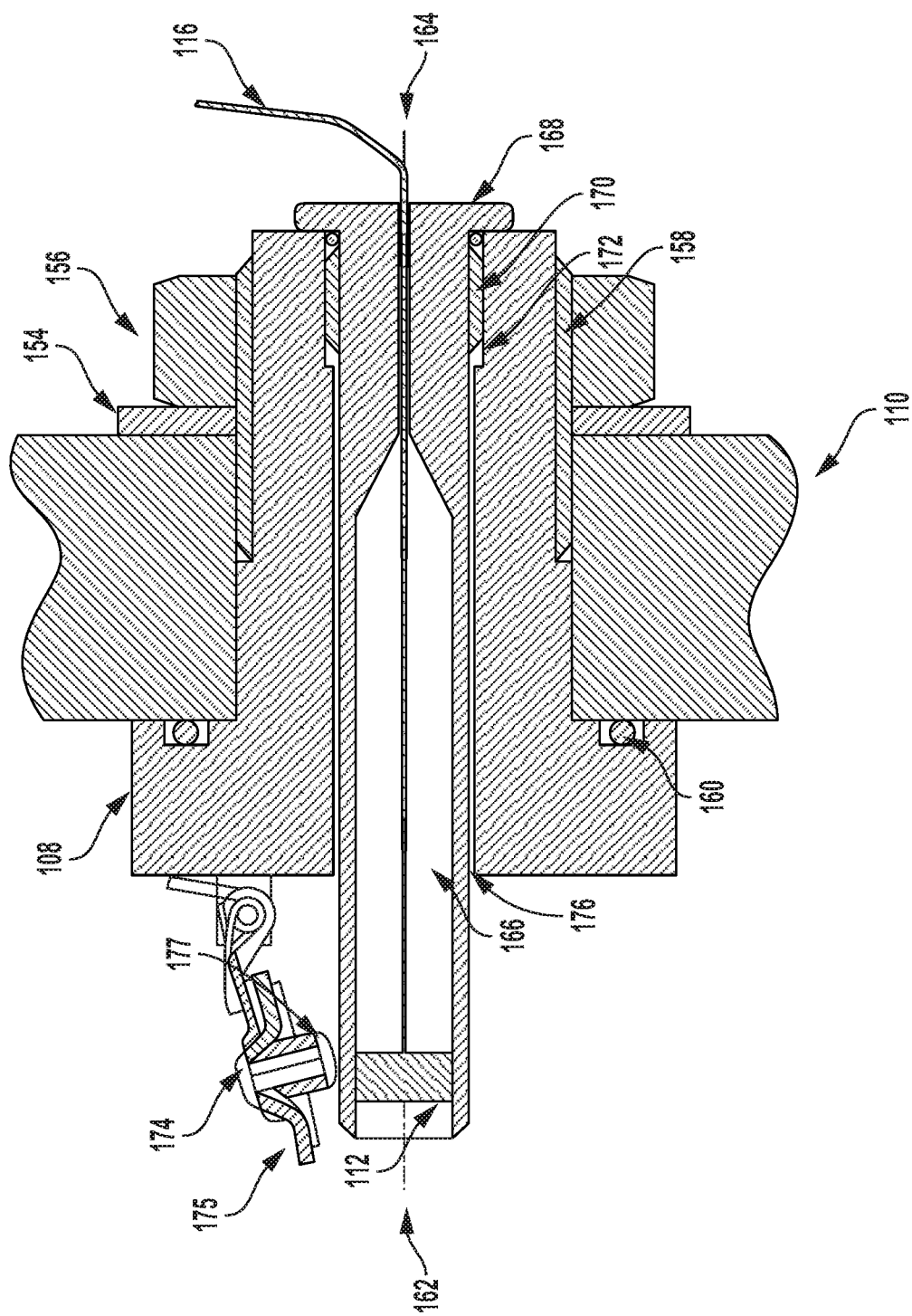
FIG. 3 illustrates an example of one of the optical sensor(s) mounted in one of the fitting(s), according to an example embodiment.

FIG. 3 illustrates an example of one of the optical sensor(s) 112 mounted in one of the fitting(s) 108, according to an example embodiment. The fitting(s) 108 is shown mounted through the wall 110 of the fuel tank 106. The fitting(s) 108 includes a gasket 154 and a securing mechanism 156 to seal the fitting(s) 108 to the wall 110 of the fuel tank 106. The gasket 154 and the securing mechanism 156 can also include a washer and a nut, for example. The gasket 154 can further include an O-ring and sealant to enable a water tight seal.

The fitting(s) 108 can be further bonded to the wall 110 of the fuel tank 106 using a bond or adhesive 158, and thus, in one example, the fitting(s) 108 are not removable once installed. In addition, the fitting(s) 108 can be mounted to an interior surface of the wall 110 by attaching over a protrusion 160. Two protrusions are shown and help with alignment of the fitting(s) 108 to the wall 110 of the fuel tank 106.

The optical sensor(s) 112 is positioned within the fitting(s) 108 such that a first pressure sensing end 162 is inserted through the fitting(s) 108 and internally into the fuel tank 106 and a second end 164 extends externally from the fuel tank 106. The first pressure sensing end 162 includes pressure sensing components, and the second end 164 is a rear or backend of the optical sensor(s) 112. A potting 166 of the optical sensor(s) 112 is also shown internal to a housing 168 of the optical sensor(s) 112. The housing 168 can include protrusions 170 to fit into an indent 172 of the fitting(s) 108.

The optical fiber(s) 116 extend from the second end 164 of the housing 168 of the optical sensor(s) 112 and connect to the optical fiber bundle 114.

FIG. 3 also illustrates a flapper valve 174 mounted on an internal surface of the wall 110 within the fuel tank 106 and positioned to cover an opening 176 of the fitting(s) 108 after removal of the optical sensor(s) 112. The system 102, shown in FIG. 1, can include a plurality of flapper valves for each of the plurality of fitting(s) 108, for example.

The flapper valve 174 allows removal of the optical sensor(s) 112 without defueling. In this way, the optical sensor(s) 112 can be removed externally from the fitting(s) 108 while the fuel tank 106 has fuel, and there will be no or minimal leakage. The flapper valve 174 will close upon removal of the optical sensor(s) 112 using a spring mechanism, for example. This enables maintenance of the optical sensor(s) 112 without having to drain the fuel tank 106. In addition, upon insertion of the optical sensor(s) 112 into the fitting 108, the flapper valve 174 will open upon contact with the optical sensor(s) 112.

The flapper valve 174 thus is sized to fit into the opening 176. For example, the flapper valve 174 includes a stopper 177 to fit into the opening 176, and also includes flanges 175 to abut an interior surface of the fitting 108 to further seal the opening 176 upon removal of the optical sensor(s) 112.

Figure 4:
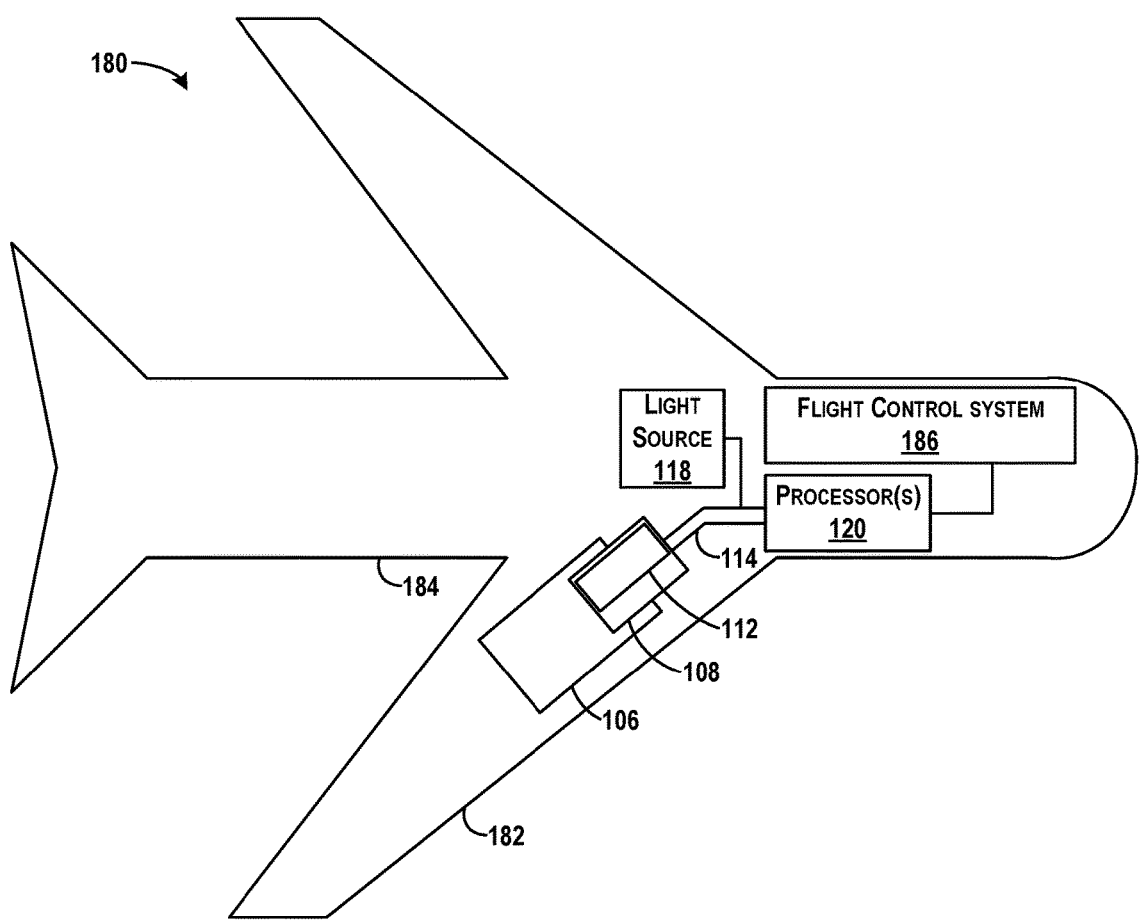
FIG. 4 is a block diagram of an example aircraft, according to an example embodiment.

FIG. 4 is a block diagram of an example aircraft 180, according to an example embodiment. The aircraft 180 may include the system 102, although only a portion of the system 102 is shown in FIG. 4 for simplicity. The aircraft 180 includes the fuel tank 106 positioned in one or more of a wing 182 and a fuselage 184 of the aircraft 180. In some examples, the fuel tank 106 can be positioned entirely within the wing 182. In other examples, the fuel tank 106 can be positioned entirely within the fuselage 184. In still other examples, as shown in FIG. 4, the fuel tank 106 can be positioned to have a portion within the wing 182 and a portion within the fuselage 184.

Figure 5:
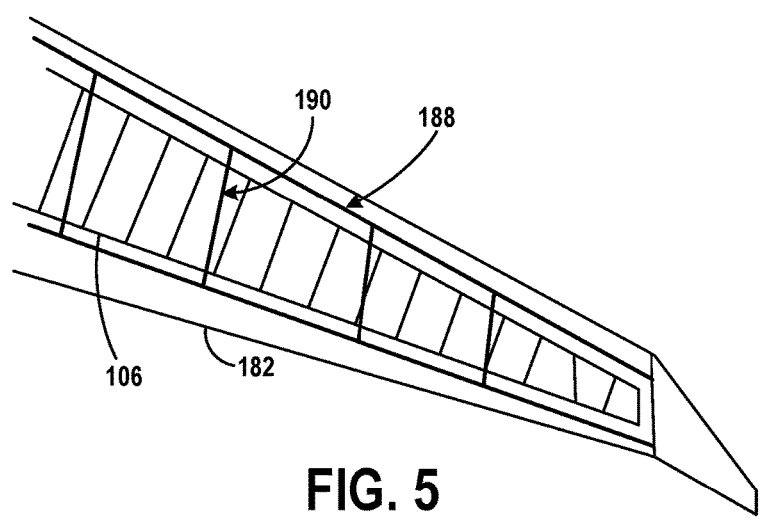
FIG. 5 illustrates an example of the wing including the fuel tank, according to an example embodiment.

FIG. 5 illustrates an example of the wing 182 including the fuel tank 106, according to an example embodiment. In FIG. 5, the fuel tank 106 is shown to be positioned in the wing 182 and to extend to a tip of the wing 182. The fuel tank 106 is also shown to be divided into multiple sections. Each section may include at least one optical sensor 112, for example. In other examples, the fuel tank 106 does not include multiple sections.

In FIG. 5, internal structural components of the wing 182 are also shown including a spar 188 and a rib 190. Multiple spars and ribs are shown and are included for structural support. Ribs may run chordwise along the wing 182, and spars may run lengthwise along the wing 182 (e.g., from the fuselage 184 to a tip of the wing 182).

Referring back to FIG. 4, other components of the system 102, such as the light source 118 and the processor(s) 120 may be positioned elsewhere in the aircraft 180, or adjacent to the fuel tank 106 as well.

The processor(s) 120 are connected to the optical fiber bundle 114 for receiving outputs of the optical sensor(s) 112 indicative of respective pressures, and for determining a fuel level measurement of the fuel tank 106 based on the outputs of the optical sensor(s) 112 and accounting for any deflections of the wing 182 and flight dynamics. In this regard, the aircraft 180 includes a flight control system 186 that can determine flight dynamics of the aircraft 180, such as a roll, a pitch, and a yaw, and the processor(s) 120 can receive information related to the roll, the pitch, and the yaw of the aircraft 180 and thus the fuel tank 106 from the flight control system 186.

Figure 6:
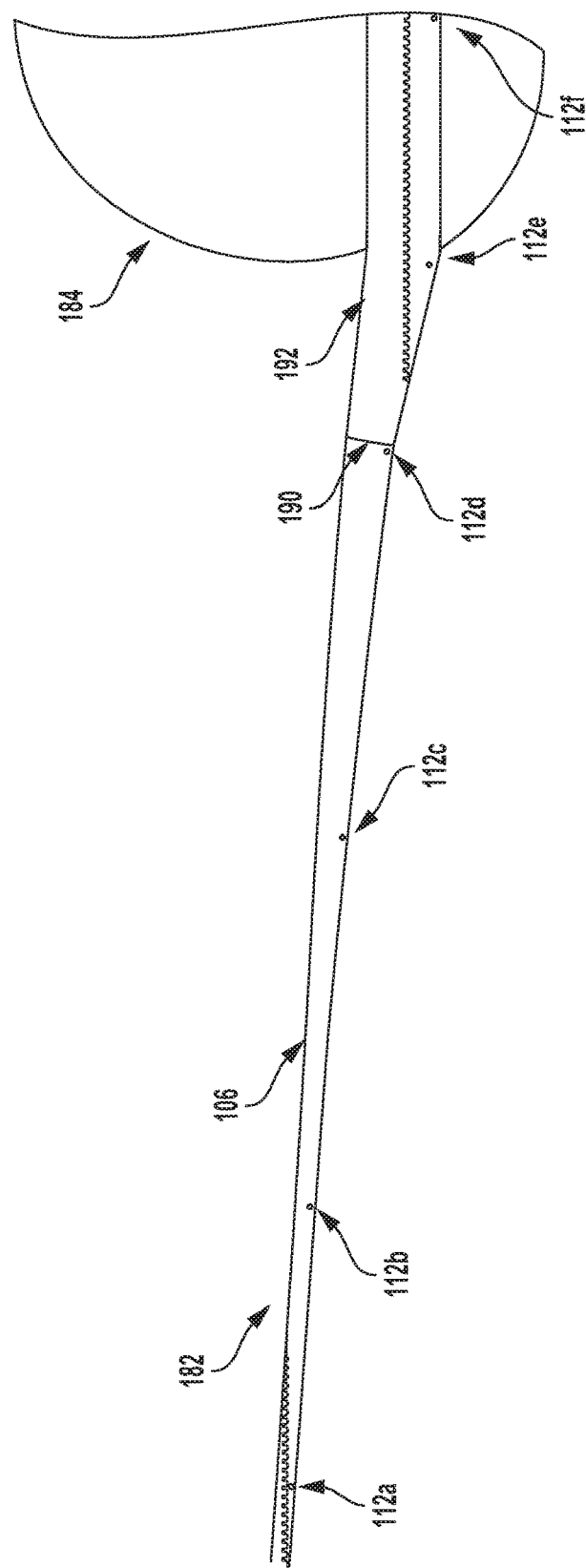
FIG. 6 illustrates a portion of the aircraft including the wing, according to an example embodiment.

FIG. 6 illustrates a portion of the aircraft 180 including the wing 182, according to an example embodiment. In FIG. 6, the fuel tank 106 is positioned in the wing 182 and a second fuel tank 192 is shown within the wing 182 as well adjacent to the fuel tank 106 and separated by an internal rib 190 of the wing 182. The fuel tank 106 and the fuel tank 192 are each shown including a volume of fuel.

The fitting(s) 108 can be mounted to the fuel tank 106 or the fuel tank 192 along and/or through one or more of the internal ribs (e.g., rib 190) of the wing 182, for example. The fitting(s) 108 can also be mounted to the fuel tank 106 or the fuel tank 192 along and/or through a front or a rear of one of the spars (e.g., spar 188) of the wing 182, for example.

FIG. 6 illustrates multiple optical sensor(s) 112a-d mounted along wing spars for the fuel tank 106, as well as multiple optical sensor(s) 112e-f mounted along wing spars for the fuel tank 192, for example. In these examples, the fitting(s) 108 enable external access to the optical sensor(s) 112a-f.

The optical sensor(s) 112a-f can be mounted anywhere along a front or rear of the wing 182, and a number of optical sensors to include can depend upon a size of the fuel tank 106 as well as a desired accuracy of the fuel measurement system, for example.

Figure 7:
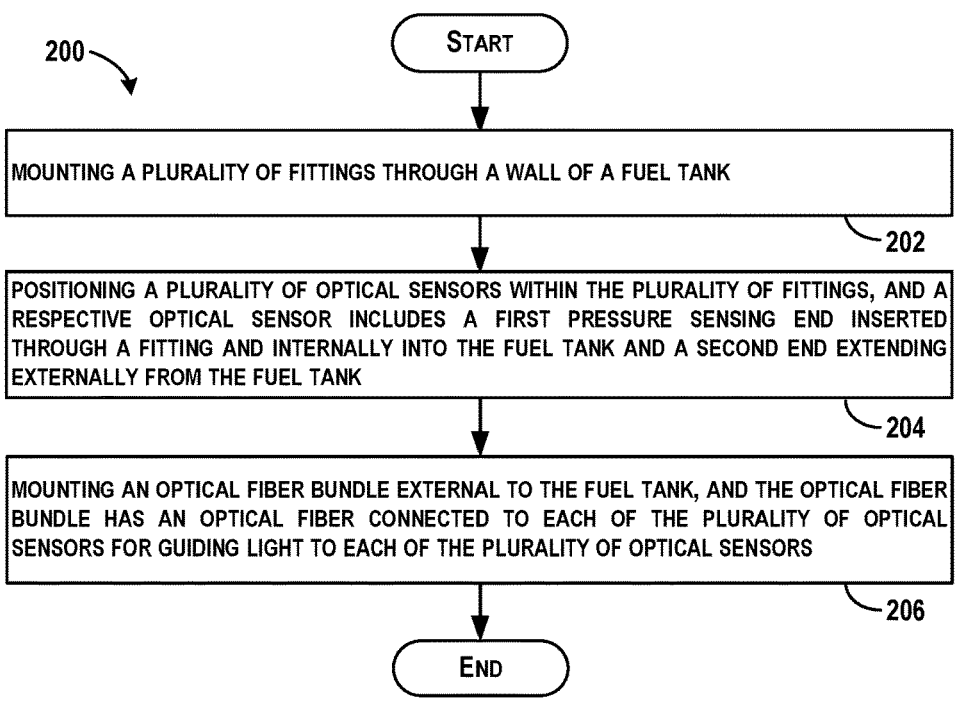
FIG. 7 shows a flowchart of an example method for installing optical sensor(s) for a fuel level measurement system, according to an example embodiment.

FIG. 7 shows a flowchart of an example method 200 for installing optical sensor(s) 112 for a fuel level measurement system 102, according to an example embodiment. Method 200 shown in FIG. 7 presents an embodiment of a method that could be used with the apparatus 100 and the system 102 shown in FIG. 1 and the aircraft 180 shown in FIG. 4, for example. Further, devices or systems may be used or configured to perform logical functions presented in FIG. 7. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes mounting the plurality of fitting(s) 108 through the wall 110 of the fuel tank 106.

At block 204, the method 200 includes positioning the plurality of optical sensor(s) 112 within the plurality of fitting(s) 108, and a respective optical sensor includes the first pressure sensing end 162 inserted through a fitting and internally into the fuel tank 106 and the second end 164 extending externally from the fuel tank 106.

At block 206, the method 200 includes mounting the optical fiber bundle 114 external to the fuel tank 106, and the optical fiber bundle 114 has the optical fiber(s) 116 connected to each of the plurality of optical sensor(s) 112 for guiding light to each of the plurality of optical sensor(s) 112.

Figure 8:
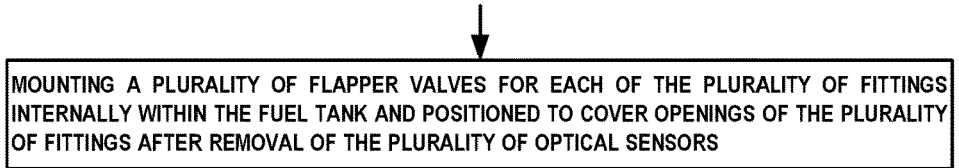
FIG. 8 shows a flowchart of an example method for use with the method, according to an example embodiment.

FIG. 8 shows a flowchart of an example method for use with the method 200, according to an example embodiment. At block 208, functions include mounting a plurality of flapper valve(s) 174 for each of the plurality of fitting(s) 108 internally within the fuel tank 106 and positioned to cover opening(s) 176 of the plurality of fitting(s) 108 after removal of the plurality of optical sensor(s) 112.

Figure 9:
FIG. 9 shows a flowchart of an example method for use with the method, according to an example embodiment.

FIG. 9 shows a flowchart of an example method for use with the method 200, according to an example embodiment. At block 210, functions include sealing the plurality of fitting(s) 108 to the wall 110 of the fuel tank 106 with the gasket 154.

Figure 10:
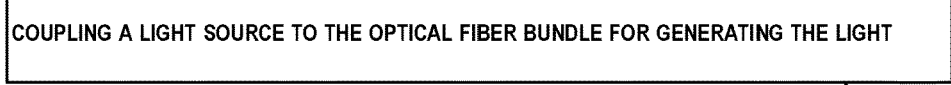
FIG. 10 shows a flowchart of an example method for use with the method, according to an example embodiment.

FIG. 10 shows a flowchart of an example method for use with the method 200, according to an example embodiment. At block 212, functions include coupling the light source 118 to the optical fiber bundle 114 for generating the light.

The apparatus 100 described can use the optical sensor(s) 112 to replace current fuels quantity indication system (FQIS) with new intrinsically EMI safe system that requires no metal in the fuel tank 106. For example, using the optical fiber bundle 114, metal wires are not needed to be inserted into the fuel tank 106 and there is no need for redundant supports since the fitting(s) 108 are inserted through the wall 110 of the fuel tank 106. It is desired to eliminate use of copper wiring in the fuel tank 106, and use of the fitting(s) 108 and the optical fiber bundle 114 can do so. This decreases system weight and manufacturing time.

The apparatus 100, or components of the apparatus 100, can be used in applications such as fuel tank measurement, where the environment due to conditions such as heat or safety concerns can lead to difficult engineering challenges. The apparatus 100, or components of the apparatus 100, can also be used for any type of fluid height measurements including with pipelines or fuel tanks, for example.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
   a fuel tank;
   a plurality of fittings mounted through a wall of the fuel tank;
   a plurality of optical sensors positioned within the plurality of fittings, wherein a respective optical sensor includes a first pressure sensing end inserted through the fitting and internally into the fuel tank and a second end extending externally from the fuel tank; and
   an optical fiber bundle mounted external to the fuel tank, wherein the optical fiber bundle has an optical fiber connected to each of the plurality of optical sensors for guiding light to each of the plurality of optical sensors.

2. The system of claim 1, wherein the plurality of optical sensors each include a sensor chip and a diaphragm that deflects when ambient pressure differs from a reference pressure of the sensor chip.

3. The system of claim 1, wherein the plurality of optical sensors comprise photonic crystal optical pressure sensors.

4. The system of claim 1, further comprising:
   a plurality of flapper valves for each of the plurality of fittings, wherein the plurality of flapper valves are mounted internally within the fuel tank and are positioned to cover openings of the plurality of fittings after removal of the plurality of optical sensors.

5. The system of claim 1, wherein the plurality of fittings comprise:
   a gasket for sealing the plurality of fittings to the wall of the fuel tank.

6. The system of claim 1, wherein the plurality of fittings are bonded to the wall of the fuel tank.

7. The system of claim 1, further comprising a light source coupled to the optical fiber bundle for generating the light.

8. The system of claim 1, further comprising:
   a computing device having a processor and data storage storing instructions executable by the processor for:
      receiving outputs indicative of respective pressures from the plurality of optical sensors; and
      determining a fuel level measurement of the fuel tank based on the outputs from the plurality of optical sensors.

9. The system of claim 8, wherein the processor executes the instructions for determining the fuel level measurement of the fuel tank by:
   determining a height of fuel in the fuel tank based on the outputs from the plurality of optical sensors; and
   calculating a volume of fuel in the fuel tank based on the height.

10. An aircraft comprising:
    a fuel tank positioned in a wing of the aircraft;
    a plurality of fittings mounted through a wall of the fuel tank;
    a plurality of optical sensors positioned within the plurality of fittings, wherein a respective optical sensor includes a first pressure sensing end inserted through the fitting and internally into the fuel tank and a second end extending externally from the fuel tank; and
    an optical fiber bundle mounted external to the fuel tank, wherein the optical fiber bundle has an optical fiber connected to each of the plurality of optical sensors for guiding light to each of the plurality of optical sensors.

11. The aircraft of claim 10, wherein the plurality of fittings are mounted to the fuel tank along one or more internal ribs of the wing.

12. The aircraft of claim 10, wherein the plurality of fittings are mounted to the fuel tank along a front or a rear of a spar of the wing.

13. The aircraft of claim 10, wherein the plurality of optical sensors each include a sensor chip and a diaphragm that deflects when ambient pressure differs from a reference pressure of the sensor chip.

14. The aircraft of claim 10, wherein the plurality of optical sensors comprise photonic crystal optical pressure sensors.

15. The aircraft of claim 10, further comprising:
    a plurality of flapper valves for each of the plurality of fittings, wherein the plurality of flapper valves are mounted internally within the fuel tank and are positioned to cover openings of the plurality of fittings after removal of the plurality of optical sensors.

16. The aircraft of claim 10, wherein the plurality of fittings comprise:
    a gasket for sealing the fitting to the wall of the fuel tank.

17. The aircraft of claim 10, wherein the plurality of fittings are bonded to the wall of the fuel tank.

18. The aircraft of claim 10, further comprising a light source coupled to the optical fiber bundle for generating the light.

19. The aircraft of claim 10, further comprising:
    a computing device having a processor and data storage storing instructions executable by the processor for:
       receiving outputs indicative of respective pressures from the plurality of optical sensors; and
       determining a fuel level measurement of the fuel tank based on the outputs from the plurality of optical sensors.

20. The aircraft of claim 19, wherein the processor executes the instructions for determining the fuel level measurement of the fuel tank by:
    determining a height of fuel in the fuel tank based on the outputs from the plurality of optical sensors; and
    calculating a volume of fuel in the fuel tank based on the height.

* * * * *